United States Patent [19]
DiGiulio

[11] Patent Number: 4,587,572
[45] Date of Patent: May 6, 1986

[54] FILM TO TAPE TRANSFER SYSTEM

[75] Inventor: Edmond DiGiulio, Malibu, Calif.

[73] Assignee: Cinema Products Corporation, Los Angeles, Calif.

[21] Appl. No.: 484,854

[22] Filed: Apr. 14, 1983

[51] Int. Cl.$^4$ ............................................. H04N 5/782
[52] U.S. Cl. ...................................................... 360/14.3
[58] Field of Search .................. 360/13, 14.1, 14.2, 360/14.3, 15; 358/345, 346, 347, 348, 311, 244, 244.1, 244.2; 352/12, 92; 369/84, 85

[56] References Cited

U.S. PATENT DOCUMENTS 4,067,049  1/1978  Kelly et al. ................... 360/14.1

FOREIGN PATENT DOCUMENTS 2822813  12/1978  Fed. Rep. of Germany ........ 352/92
1261917   1/1972  United Kingdom .................. 352/12
1302268   1/1973  United Kingdom .................. 352/12

OTHER PUBLICATIONS

Miura et al., "An Automatic Editing System, Using a Minicomputer, Scanning of the Color Negative and Broadcasting from a Videotape Transfer", Journal of the SMPTE, vol. 84, No. 10, Oct. 1975, pp. 781-789.

Phillip McFadin, "Accurate Film Edit Decision Making Using Videotape as the Medium", SMPTE Journal, vol. 90, No. 11, Nov. 1981, pp. 1085-1089.

White, "ASCII-Compatible Time-Code System for Motion-Picture Films Using Microcomputers", SMPTE Journal, vol. 85, No. 1, pp. 9-15, Jan. 1976.

Primary Examiner—Donald McElheny, Jr.
Attorney, Agent, or Firm—Weiser & Stapler

[57] ABSTRACT

A film to tape transfer system is disclosed for use with film of the type including a transparent magnetic layer on the back of the film. The coated film negative and a fullcoat, oxide coated, sprocketed sound track are fed to a tele-cine camera which inputs a VCR to produce a videotape record of the film. An SMPTE time code generator is built into the system to simultaneously write a time code on the picture track, the sound track and on the videotape. A keyboard is included to enable the operator to enter all pertinent information such as production number, camera number, director, cameraman, etc. as the films are being run.

23 Claims, 2 Drawing Figures

FILM TO TAPE TRANSFER SYSTEM

FIELD OF THE INVENTION

The present invention relates generally to the field of motion picture film editing, and more particularly, is directed to a film to tape transfer system including means to convert a film negative image to a video tape positive image while simultaneously applying a time code to the film negative, to the sound track and to the video cassette tape.

BACKGROUND OF THE INVENTION

Film editing has long been recognized as a most important discipline and consideration when creating a motion picture film of acceptable quality. Upright and flatbed machines have been developed by prior workers in the art to aid in the editing process and such machines have become available in many forms. Editing machines have been developed for either 35 mm or 16 mm film and designs have been provided to enable the running of multiple films and multiple sound tracks simultaneously for editing purposes. Some of the prior art machines have been adapted to handle multiple film work prints and a single sound track. Other machines can run multiple sound tracks and a single film work print.

A picture display monitor is usually provided together with speakers, controls, marking facilities, cutters, etc. as may be necessary or desirable to aid in the film editing process. Cinema Products Corporation, Los Angeles, Calf., the assignee of the present invention, has developed a line of upright/flatbed (U/F) editing tables for use with both 16 mm and 35 mm film. Hollow polygon, flicker-free optical systems have been incorporated in the Cinema Products Corporation editing tables, and with suitable modifications it is contemplated that such tables could be adapted to make film-to-tape transfers for off-line tape editing in accordance with the teachings of the present invention.

The "Videola" as manufactured by Movieola Corp., is a known type of film-to-tape transfer machine which uses a glass hollow polygon and a TV camera with phase reversal, thereby permitting direct transfer from camera negative to videotape. The "Videola" transfer machine has no code read, write or generating capability. The sound track is on a separate reproducer that is phase locked to the "Videola".

In the film editing process, the synchronization of sound and picture has always been a most important consideration. Since practically the beginning of the motion picture industry, a device known as a clapperboard has universally been employed as an aid in the editing process by synchronizing sound and picture. The clapping of the hinged section provides an exact visual and aural reference point and also provides ready identification by including on the device itself such information as scene and take numbers, camera number, director, title, etc. Such information has been indispensable during the cutting and editing procedures.

More recently, videotape has been widely employed in place of film as a recording and/or release medium for television use. While the quality of the images produced by tape cannot equal the equality inherent in motion picture film, the videotape productions have proved to be satisfactory for television release. The employment of videotape can result in notable economies, both in the production costs and in editing. Highly efficient and economical means of editing and assembling the final product by utilizing the advantages and economies of electronic image reproduction have resulted in wide acceptance and use of videotape in television productions.

Videotape editing technology has now advanced to the point where the editing process can be fully automated by utilizing newly developed electronic editing machines wherein all images can be transferred electronically. There is now no need to cut and splice the tape. Additionally, because of its electronic capability, it is now possible to search for and find any particular section on the videotape in seconds, thereby saving considerable editing time.

In current practice in video production, videotape editing has been made extremely easy and automatic by the addition of a time code track to the video tape. A preselected time code can then be encoded by employing a time code generator of known construction, for example, the time code generator as manufactured by EECO, Gray Engineering, Skotel, etc. These time code generators have all been used, up until now, only for tape production. The code is usually put on during production, but putting code on tape in post production is also common.

The time code that has been universally adopted in the United States at the present time is the Society of Motion Picture and Television Engineers (SMPTE) Standard Time Code, which code is recorded on the videotape together with the images. The SMPTE Standard Time Code has 80 bits per frame and portions of these bits are usually allocated for such information as time, data, production number, camera number, scene, take, frame identifying number, etc. (i.e. "user bits").

Once the original production has been completed, and a master tape has been produced, the master tapes are transferred to ¾ inch cassettes which can then be taken to an off-line editing facility for editing in known manner. The term 'off-line', as used herein is defined to connote that the editing process is not done in real time. As the editor makes his cuts, this information is then stored in memory in known manner and when the final edited version is developed, the time code address for the frame upon which a particular cut is to be made is printed out on an 'edit decision list' as well as being available either on punched paper tape or floppy disk memory.

The post production editing of videotape utilizing the editing facilities which have been developed for this purpose has proved to be a most efficient and economical method of editing and assembling a final release print. The present videotape editing procedures present considerable economies over the presently available methods of post production film editing. It is noteworthy that the ¾ inch tape utilized in video editing is not of broadcast quality, but is used merely as a work print. The currently available videotape editing systems comprise playback and recording machines, preview and master monitors and keyboard control consoles which are designed to enable an editor to rapidly try and retry as often as desired all editing techniques such as cuts, lap dissolves, fades, wipes, etc. Inasmuch as all of the images are transferred electronically, there is no need to physically cut the tape, thereby offering a distinct advantage over film.

Once the editor has completed the editing process on the inexpensive ¾ inch tape editing system, the floppy disk and the master tapes, which are usually on one inch tape, can then be brought to a more expensive 'on-line' editing system. By loading up the master tapes and by inserting the floppy disk, the editor can then automatically assemble a final broadcast quality version of the show because the same time code that appeared on the ¾ inch editing tapes will also appear on the master tapes. In this manner, the edit decisions emanating from the floppy disk can be utilized to validly interact with the master tape, all without requiring any cutting of the tape.

In seeking to utilize the same efficiencies and economies available in editing videotape, film makers have for some time attempted to utilize a time code similar to the SMPTE code on the film to thereby permit the same post production techniques which are utilized in the video post production to be applied to the film post production procedures. Most prior art efforts to impress a suitable time code on film have been directed to writing the code on the film in the camera by employing optical means. Usually, an LED or an LED array would be installed in the film aperture and an external time code generator was employed to drive the LED to write an optical code on the camera negative as the film was carried past the lens (as done by Arriflex in Germany and Eclair and Aaton in France). Such optical time codes were advantageous in that they were permanent and non-erasable. Additionally, such an optical track could be easily transferred to the print during the printing process.

However, the employment of a time code with film has always presented numerous problems. Inasmuch as frame accuracy is of critical importance in editing, the only way that this could be assured was to position the code writing mechanism directly at the film aperture. It must be noted that the film aperture or gate area of a motion picture camera is a very confined and cramped region and therefore there is little space available for the installation of any hardware. Accordingly, practical design and installation problems are inherent in this approach. Additionally, the film will be moving intermittently at the gate and therefore, the code will be written in a non-linear fashion. As an alternate solution to the problem, should the writing mechanism be installed at a position remote from the gate at a location where the film is moving in a linear fashion, then there is the difficulty of assuring that the code will be written in such a manner as to unambiguously identify the exact frame to which that code relates.

Further, in addition to the problems attendant with the code being written in the camera itself, it will be appreciated that an identical code must be recorded on the sound track in the ¼ inch tape recorder that is typically used in the film production. Once the time code had been provided, then the film could be transferred to a videotape positive by reverse-phasing the developed negative for editing and then back to film in the final version. Without such a time code, then there would be no way to conform the edited version back to film. At the present time, an acceptable method of applying a time code to film has not been popularly adopted.

Most recently, Eastman Kodak Company, Rochester, N.Y., has announced the availability of a new motion picture film that has specially been developed to incorporate magnetic control surface technology. Eastman Kodak Company has announced that a transparent magnetic layer has now been developed which is applied on the side of the film opposite the photographic emulsion. Further, the transparent magnetic layer system has been utilized both with 16 mm film and with 35 mm film. The magnetic layer covering the complete back surface of the film may now be magnetically encoded, in conveniently selected track areas, with digital information such as the SMPTE time code, thereby opening an entirely new vista in the post production techniques available for film editing.

SUMMARY OF THE INVENTION

The present invention relates generally to the field of film editing, and more particularly, is directed to a film to tape transfer system including an SMPTE time code generator in combination with a tele-cine camera, and suitable controls to produce an encoded video cassette tape from an input film negative.

It is the basic concept of this invention that the newly available Eastman Kodak coated film be utilized and that a time code as produced by the SMPTE time code generator be applied to the coated surface. The time code will be written on all pertinent documents at the time of transfer from film to videotape during the post production process, that is, on the magnetic layer on the back of the film, on the sound track and on the produced videotape. As the camera negative and the sound track are fed through the transfer system, the video camera functions to transfer the film to tape for recording on ¾ inch videotape in the form of an off-line transfer. The SMPTE time code generator functions to simultaneously apply the SMPTE time code to the sound track, to the camera negative and to the videotape during the film to tape transfer procedures.

Necessary integral electronics can be provided in the device in known manner to facilitate the subsequent tape editing process and these may include registers for storing appropriate time code data and registers for user bit information. A keyboard of known construction is provided to permit an operator to enter information into the various registers as may be appropriate for the film being processed. In a typical operation, an arbitrary starting time would be established for a given reel to be transferred and the other pertinent information, such as production number, camera number, director, cameraman, etc. would be entered into the appropriate registers by way of the keyboard. As a clapperboard or other audio notation occurred to identify a particular scene and take number, it is contemplated that the operator will key this information in on the fly. It is noteworthy that the time code generator, when in operation, will write simultaneously on the picture track, the sound track and on the videotape an identical code which will be precisely frame accurate. In this manner, after the film to tape transfer, the known videotape editing technology can then be applied to film.

By utilizing the keyboard entry system, the operator will be enabled to provide all of the information that one would require if the code were to be written during the actual production situation. It is noteworthy that one person will be coding all three records simultaneously so that no error can possibly occur. In a production situation, it is contemplated that the camera assistant would key the information for the camera record in through a known black box which is part of the time code generator. The sound mixer would be equally responsible for keying the same data into the sound records and most probably, a script person would have an identical responsibility for record-keeping purposes.

The invention requires, as a trade-off, that the processed negative be synchronized to the full coat sound track in the conventional manner (i.e. using clap stick information as a synchronizer). If time codes were put on in the camera and recorder during production, it would be possible to make the synchronizing process more automatic, as synchronizers or edit tables could be modified to read time code. This, however, is where the problem of frame ambiguity comes in. The gain we achieve is positive frame accuracy and the cost and labor saving occasioned by not doing it during actual production.

In using the film to tape transfer system of the present invention, after the camera negative has been developed it can immediately be transferred to ¾ inch video cassettes by utilizing a film-tape transfer apparatus which has the capability of converting the film negative image to a video positive image. During the transfer process, the SMPTE time code is applied to the film, to the sound track and to the videotape to thereby identify accurately every film frame. The tape can then be processed on an off-line editing system of known construction, that enables an edition to try and retry all desired editing cuts, and other editing techniques in the same manner as would be the case where the source material was originally videotape. Additionally, also in view of the fact that everything will be electronic, advance or rewind can be accomplished at speeds up to thirty times the present norm for film, thereby allowing the accessing of any given scene automatically at speeds considerably greater than the capability of presently available film editors.

The system software of the off-line editing system is configured so that each time a valid edit decision is made, the frame identification as accurately given by the time code, will be stored in memory. When a final, edited version of the film on tape is completed, a printout will be automatically made of all edit decisions.

Because the equipment is an off-line facility, it can be of the lesser quality ¾ inch format type and therefore, the hourly cost for using such a facility will be relatively low.

Once all of the editing decisions have been made, the edit decision list can be used to conform back to original camera negative by means of film editing tables or synchronizers modified to read and display the time code.

It is therefore an object of the present invention to provide an improved film to tape transfer system of the type set forth.

It is another object of the present invention to provide a novel film to tape transfer system which incorporates a built-in time code generator to apply a standard SMPTE time code to the moving webs.

It is another object of the present invention to provide a novel film to tape transfer system that includes means to write a standard time code simultaneously on all relevant documents during the film to tape transfer process, the relevant documents comprising the film negative, the sound track and the output videotape. In certain cases, this may also include a workprint.

It is another object of the present invention to provide a novel film to tape transfer system including means to transfer a separate film camera negative and oxide coated film sound track to video cassette configuration and means to write a time code simultaneously upon the film camera negative, the sound track and the video cassette recording.

It is another object of the present invention to provide a novel film to tape transfer system comprising in combination means to transfer a film camera negative and a sound track oxide coated film to a magnetic tape, means to encode the film camera negative, the sound track and the magnetic tape with a time code and keyboard entry means to key pertinent user bit information during the film to tape transfer process.

It is another object of the present invention to provide a novel film to tape transfer system that is automatic in operation and that can simultaneously apply a standard SMPTE time code to the input films and to the output tape in a manner that is precisely frame accurate.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1:
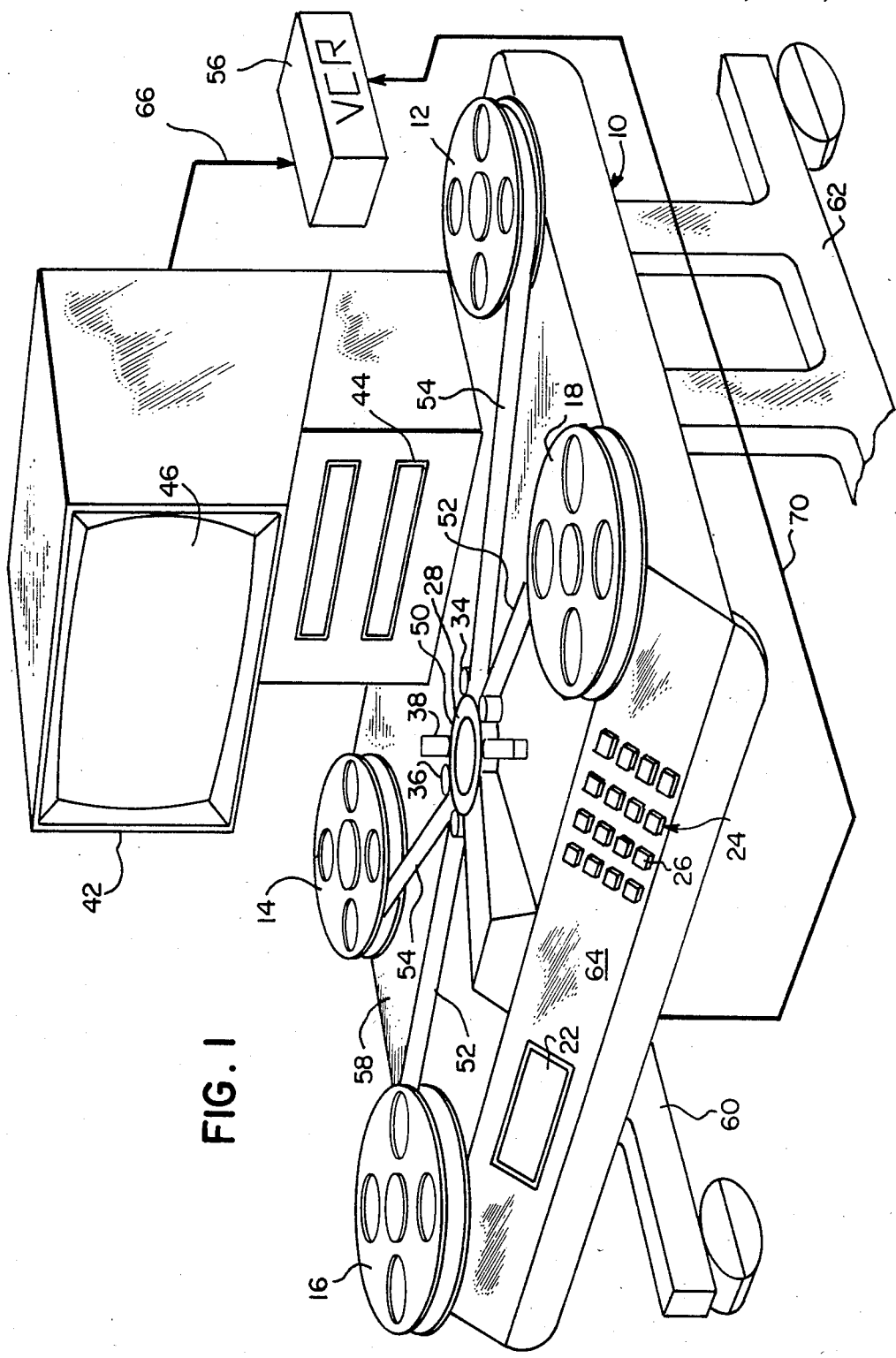
FIG. 1 is a partly perspective and partly schematic view showing the operating components of the film to tape transfer system constructed in accordance with the teachings of the present invention.

Although specific terms are used in the following description for the sake of clarity, these terms are intended to refer only to the particular structure of the invention selected for illustration in the drawings, and are not intended to define or limit the scope of the invention.

Referring now to the drawings, there is illustrated a film to tape transfer system generally designated 10 comprising a table or console 58 which is supported in well known manner by a pair of spaced supports or legs 60, 62. The console terminates forwardly in a work surface 64, which work surface may be inclined forwardly in well known manner to provide a convenient working area. As illustrated, a keyboard 24 of usual construction is mounted in the inclined work surface 64 whereby the individual keys 26 can be readily manipulated for information input purposes in the manner hereinafter more fully set forth.

Rotatively supported upon the console 58 in manner well known to those skilled in the editing and film transfer machine art are film camera negative feed and takeup reels 16, 18 and sound track oxide coated film feed and takeup reels 12, 14. The camera negative film 52 and the sound track film 54 feed about the sprocket 28 in a conventional manner, which sprocket preferably is a 24-frame sprocket of construction well known to those skilled in the film transfer and editing machine art. The sprocket 28 and the circularly spaced sprocket wheels 30, 32 define the film lacing path 48 in known manner. Similarly, the sprocket 28 and the circularly spaced sprocket wheels 34, 36 define the sound track film lacing path 50. In known manner, a tele-cine camera 42 is mounted upon the table or console 58 to receive the visual and audio images from the films 52, 54 and to produce a video output 66 that is capable of being recorded in a conventional video cassette recorder (VCR) 56 in well known manner. The transfer may be either at 24 or 30 video f.p.s. In accordance with techniques known to those skilled in the art, a transfer means could employ a polygon or strobe light in those constructions wherein a video camera is employed as the recording means. In another approach, the transfer means could utilize a flying spot scanner, such as used by the Rank Cintel machine, instead of a TV camera.

The tele-cine (video camera) 42 is of the polarity reversal type of known construction whereby a negative film image can be converted to a positive TV image in the usual manner. The tele-cine camera output 66 is recorded in the video cassette recorder 56 for subsequent off-line editing in the manner well known to those skilled in the magnetic tape editing industry. As above set forth, in order for the transfer system 10 to function in the designed manner, the film 52 must be of the newly available type wherein a transparent magnetic coating (not illustrated) is applied to the back 72 of the film.

Figure 2:
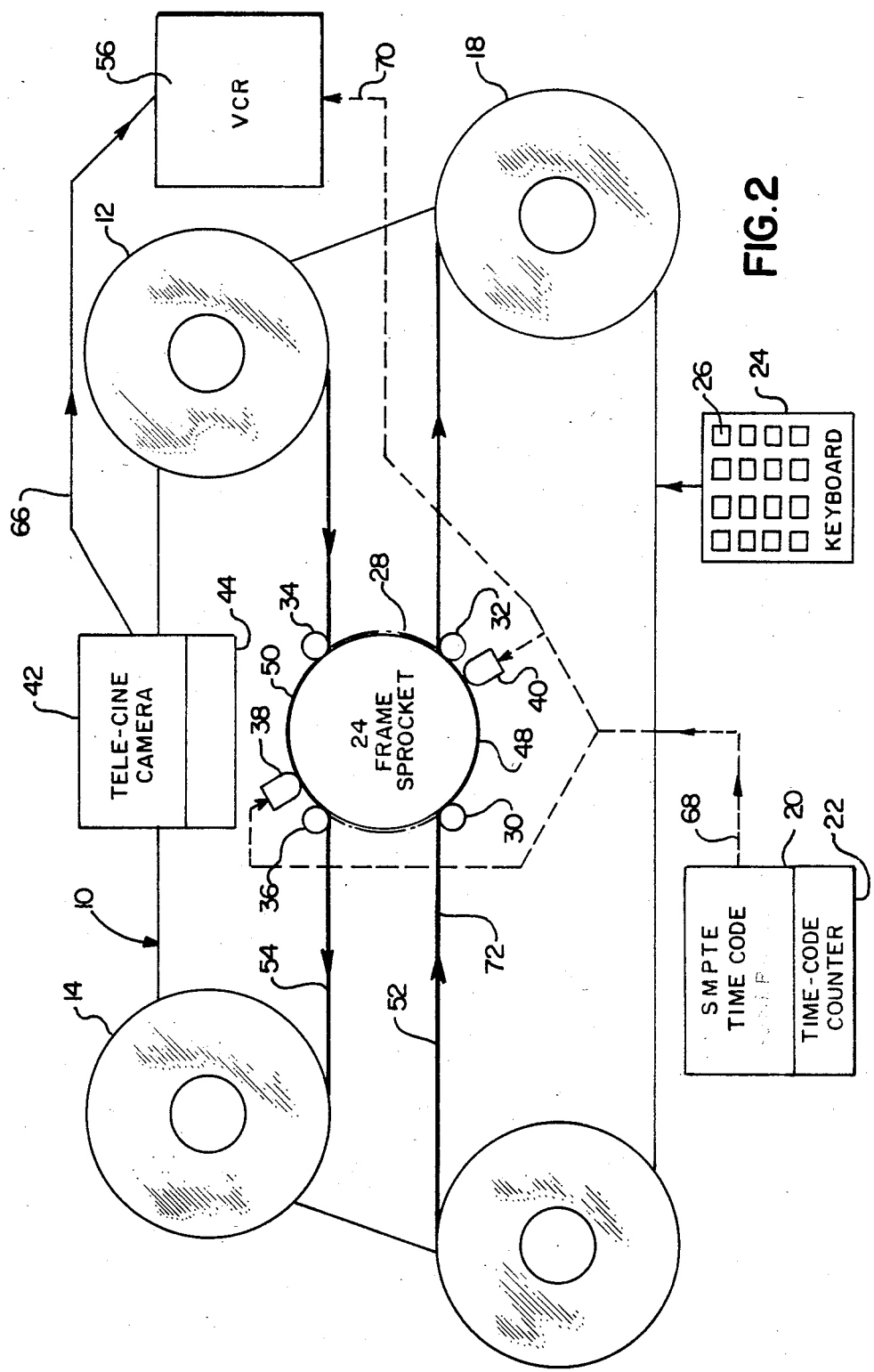
FIG. 2 is a schematic diagram showing the operating components of the film to tape transfer system.

A time code generator 20 of known construction is mounted within the console or table 58 to write a fully valid production time code (not illustrated) such as the standard SMPTE time code simultaneously on the camera negative 52, the sound track 54 and the videotape (not illustrated) which is recorded in the video cassette recorder 56. The simultaneous application of the time code on all three documents guarantees frame accuracy. As illustrated schematically in FIG. 2, the time code output signal 68 from the time code generator 20 is fed simultaneously to the sound track recording head 38, to the camera negative recording head 40 and to the time code input 70 provided in the VCR 56. Preferably, the time code generator 20 produces a standard time code, for example the SMPTE time code for ready use by those skilled in the videotape editing art.

It will be appreciated that the camera negative film 52 employed in the transfer system 10 must be provided with a continuous magnetic coating (not shown) on the back 72 of the film for encoding the time code generated by the generator 20. The recording head 40 applies the time code signals to the magnetic track on the film in the same manner as would be utilized when employing magnetic tape.

In use, an operator (not shown) will load the transfer system 10 with a pre-synchronized magnetic coated camera negative 52 in the optical track or lacing path 48 and with a full coat oxide coated sprocketed sound track film 54 in the sound track lacing path 50. As the films 52, 54 are run about the 24-frame sprocket 28, the keyboard 24 can be functioned by pressing the individual keys 26 in proper sequence in known manner to provide all of the usual information that would be required if the code were being written during the actual film production. It is noteworthy that the SMPTE time code generator 20 simultaneously feeds the recording head 38, the recording head 40 and the VCR input 70, whereby a single operator in a single operation will be coding all three records as the same time so that no error can possibly occur.

As illustrated, the video or tele-cine camera 42 preferably is arranged in known manner to feed an image to a color monitor 46 to allow the operator full visual surveillance during the encoding process. Integral electronics of known construction are provided, which electronics preferably include registers 44 for storing appropriate time code data including registers for user bit information. The keyboard 24 permits the operator, by pressing the keys 26 in predetermined sequence, to enter information into these various registers 44 as may be appropriate. In a typical operation, an arbitrary starting time would be established for a given reel to be transferred and then all other pertinent information, such as the production number, the camera number, the director, the cameraman, etc. can be entered into the appropriate registers by proper utilization of the keyboard 24. As a clapperboard or other audio notation occurred as viewed in the monitor to identify a scene and take number, the operator could then key this information in as the films 52, 54 were running through the device. Preferably, counters 22 can additionally be provided in known manner to display the necessary data.

It is contemplated that the same transfer system 10 could also be utilized for the process of conforming back from a tape edit decision list to camera negative for final assembly. The same operation can also be accomplished in known manner by utilizing other presently available equipment, such as a film synchronizer which can be properly modified to read the time code generated by the time code generator 20.

Although the present invention has been described with reference to the particular embodiment herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. A film to tape transfer system comprising
   a console;
   means operatively associated with the console for drawing a camera negative film having a magnetic coating across the console;
   means operatively associated with the console for drawing a sound track film having a magnetic coating across the console;
   transfer means operatively associated with the console and configured to receive the camera negative film and the sound track film, and adapted to produce a videotape recording of the camera negative film and the sound track film as the camera negative film and the sound track film are drawn across the console;
   means for generating a time code signal; and
   recording means operatively associated with the time code generator means and the transfer means to simultaneously provide a time code signal upon the magnetic coating of the camera negative film, upon the magnetic coating of the sound track film and upon the videotape recording.

2. The transfer system of claim 1 wherein the time code generator means is an SMPTE time code generator.

3. The transfer system of claim 1 wherein the recording means comprises a camera negative recording head, a sound track recording head and a videotape recording input for simultaneously providing the camera negative film, the sound track film and the videotape recording with the time code signal, respectively.

4. The transfer system of claim 1 wherein electronic circuit means, keyboard means and register means are operatively interconnected with said time code generator means so that time code data can be entered by the keyboard and stored in the register means.

5. The transfer system of claim 4 wherein a counter is operatively connected to the electronic circuit means for the display of time code data.

6. The transfer system of claim 1 wherein the time code signal is applied to the camera negative film, the sound track film and the videotape recording as the videotape recording is being produced.

7. The transfer system of claim 1 wherein a video camera is operatively associated with the transfer means so as to produce the videotape recording.

8. The transfer system of claim 7 wherein the recording means comprises a video recorder operatively connected to the time code generator means to provide the videotape recording with the time code signal.

9. The transfer system of claim 7 wherein a color monitor is operatively associated with the video camera.

10. A film to tape transfer system comprising
means for drawing a camera negative film with a magnetic coating through a first transfer path;
means for drawing a sound track film with a magnetic coating through a second transfer path, wherein the first and second transfer paths are synchronized for simultaneous operation;
tele-cine camera means for receiving images from the camera negative film and sound from the sound track film, and for producing a video output signal;
a video recorder adapted to receive the video output signal from the tele-cine camera means and to produce a videotape recording of the sound from the sound track film and the images from the camera negative film;
time code generator means for generating a time code signal; and
recording means operatively associated with the time code generator means to simultaneously provide the time code signal upon the magnetic coating of the camera negative film, the magnetic coating of the sound track film and the videotape recording.

11. The transfer system of claim 10 wherein the camera negative film drawing means comprises a first feed reel and a first takeup reel in spaced relationship.

12. The transfer system of claim 11 wherein the sound track film drawing means comprises a second feed reel and a second takeup reel in spaced relationship.

13. The transfer system of claim 12 and a circular sprocket intermediate the first and second feed reels and the first and second takeup reels, for receiving the camera negative film and the sound track film.

14. The transfer system of claim 13 wherein a portion of the first transfer path forms a first arc about the circular sprocket.

15. The transfer system of claim 14 wherein a portion of the second transfer path forms a second arc about the circular sprocket.

16. The transfer system of claim 15 wherein the recording means comprises a first recording head positioned adjacent to the first arc and a second recording head positioned adjacent to the second arc.

17. The transfer system of claim 10 wherein the time code signal is applied to the camera negative film, the sound track film and the videotape recording as the videotape recording is being produced.

18. The method of transferring images formed in a camera negative film having a magnetic coating and sound recorded in a sound track film having a magnetic coating, to a videotape recording, comprising
drawing the coated camera negative film and the coated sound track film across a console and through a tele-cine camera means;
transferring the images on the camera negative film and the sound on the sound track film to the videotape recording, as positive images;
generating a time code signal; and simultaneously recording the time code signal upon the magnetic coatings of the camera negative film and the sound track film, and upon the videotape recording.

19. The method of claim 18 further comprising the step of keying in, by means of a keyboard, preselected information while the time code signal is being recorded.

20. The method of claim 19 further comprising the step of displaying the keyed in information.

21. The method of claim 18 wherein the time code signal is applied to the camera negative film, the sound track film and the videotape recording during said transferring step.

22. The method of claim 18 wherein said transferring is performed by means of a film to tape transfer apparatus, and further comprising the step of editing the videotape recording off-line of the film to tape transfer apparatus and in accordance with the time code signal applied to the videotape recording.

23. The method of claim 22 further comprising the step of using the edited videotape recording and the associated time code signals to provide an edited camera negative film.

* * * * *